United States Patent [19]
Holmgren

[11] 3,735,104
[45] May 22, 1973

[54] MAINTAINING DESIRED SPEED OF CUTTING TOOL IN NUMERICALLY CONTROLLED MACHINE TOOL

[75] Inventor: Per Harald Holmgren, Jonkoping, Sweden

[73] Assignee: Saab-Scania Aktiebolag, Linkoping, Sweden

[22] Filed: Sept. 13, 1971

[21] Appl. No.: 179,661

[52] U.S. Cl. ............235/151.11, 235/150.3, 318/571
[51] Int. Cl. .............................................G06f 15/46
[58] Field of Search......................235/151.11, 150.3, 235/151.32; 318/569–571, 573–574, 603, 607, 636

[56] References Cited
UNITED STATES PATENTS

| | | |
|---|---|---|
| 3,553,559 | 1/1971 | Leenhouts..........................318/571 |
| 3,428,876 | 2/1969 | Kelling......................235/151.11 X |
| 3,530,283 | 9/1970 | McDaniel........................318/571 X |
| 3,612,841 | 10/1971 | Kosem.............................318/571 X |
| 3,633,013 | 1/1972 | Dummermuth..................318/573 X |

Primary Examiner—Eugene G. Botz
Assistant Examiner—Jerry Smith
Attorney—Ira Milton Jones

[57] ABSTRACT

In a numerically controlled machine tool in which a fundamental pulse frequency determines speed of cutting tool motion along an axis, and pulses are distributed to axes according to programmed direction of cutting tool movement, successive pulses are counted into successive equal groups, each containing a number of pulses which is a multiple of the number of axes. The number of possible pulse distributions in a group is limited; hence an augmenting pulse frequency can be precomputed for each possible distribution, based on a relationship between total stairstep motion distance signified by pulses of the group and corresponding direct distance. For each group, pulses of the proper augmenting frequency are injected between pulses of the fundamental frequency so that for a given fundamental frequency speed is the same in any direction.

2 Claims, 6 Drawing Figures

PATENTED MAY 22 1973 3,735,104

MAINTAINING DESIRED SPEED OF CUTTING TOOL IN NUMERICALLY CONTROLLED MACHINE TOOL

This invention relates to numerically controlled machine tools wherein an element is movable along two or more coordinate axes to effect relative cutting motion between a cutting tool and a workpiece, and wherein the speed of such relative motion depends upon the frequency at which pulses are generated by a pulse generator; and the invention is more particularly concerned with maintenance of such relative motion at a desired speed irrespective of the direction in which it takes place.

A numerically controlled machine tool effects relative motion between a cutting tool and a workpiece carrier in accordance with a predetermined program which may be encoded on a punched tape. Either the cutting tool or the workpiece carrier may be caused to move, or both may move simultaneously, but since the motion is relative in any event, discussion of any such machine is facilitated by considering the cutting tool as the controlledly moved element, and the following discussion proceeds on that basis.

The cutting tool is controlledly movable along each of two or more coordinate axes that are perpendicular to one another. Its motion along each axis is effected by a servo for that axis. By actuation of two or more servos simultaneously, the cutting tool can be moved in any desired direction, its actual direction of motion being the vectorial sum of its components of motion along the several axes.

A numerically controlled machine tool of the type with which the present invention is concerned comprises a pulse generator which issues pulses at a fundamental frequency that may be controlledly varied. As the pulses are generated, they are assigned in a programmed sequence to the several servos. Each pulse corresponds to a predetermined increment of cutting tool motion along an axis, and hence the frequency of the pulses assigned to each servo denotes the rate of motion of the cutting tool along the axis for that servo.

Since the pulses are generated at intervals and are assigned in succession to the several servos to be operated, and since each pulse corresponds to a predetermined distance along an axis, any motion of the cutting tool that is oblique to an axis is, in theory, in a stairstep pattern. Stated in another way, for oblique motion, the cutting tool is commanded to move first in an incremental step or steps along one axis and then in an incremental step or steps along another, in accordance with the programmed assignment of successive pulses.

In fact, however, because of inertia in the drive means by which the cutting tool is propelled along each axis, whereby motion continues after termination of the pulse that commands it, the cutting tool can (and usually does) move along two or more axes simultaneously in response to successive pulse commands for movement along different axes. Hence, even though pulses are delivered in a manner to command movement of the cutting tool along a stairstep path, the actual movement of the tool is along a substantially smooth line.

However, the stairstep pattern of pulse commands has heretofore created a serious problem with respect to speed at which the cutting tool moves in different directions. This problem arises from the fundamental fact that each pulse denotes a defined increment of movement along an axis. During oblique travel of the cutting tool the pulses are commanding a stairstep movement at a certain rate, whereas the cutting tool, in moving along a substantially direct path, is in effect taking a shortcut across the route that the distributed pulses are commanding. It will be apparent that for the cutting tool to traverse this shortcut path in the same time interval that it would require to follow the stairstep route, it must travel more slowly than it would do in motion parallel to an axis at the same fundamental pulse frequency. Thus, if the direction of movement of the cutting tool is, for example, at 45° to each of the axes in a rectangular three-axis system of coordinates, the speed of the cutting tool will be only $1/\sqrt{3}$ of the speed that it would have along one of the axes at the same pulse frequency, which is to say it will be 42 percent too low.

It is obvious that such deviations from the optimum speed of the cutting tool cannot be tolerated. Various expedients have heretofore been proposed for automatic correction of the cutting tool speed for the purpose of making it largely independent of the direction of cutting tool movement. See, for example, Swedish patent application 8765/68 and German patent No. 1,463,238.

The present invention has for its general object to provide a very simple and accurate method of automatically maintaining substantially a desired speed of the cutting tool of a numerically controlled machine tool, irrespective of its programmed direction of motion, which method can be practiced by means of relatively inexpensive and uncomplicated apparatus.

It is another and more specific object of this invention to provide, for a numerically controlled machine tool of the character described, a method of automatically so controlling the speed of the cutting tool as it moves in any direction oblique to the coordinate axes of the machine as to maintain that speed at substantially the same value that it would have if the tool were moving along one of said axes, so that the speed of movement of the cutting tool can be programmed without regard to the direction in which it is moving and the cutting tool will maintain substantially the programmed speed of movement.

With these observations and objectives in mind, the manner in which the invention achieves its purpose will be appreciated from the following description and the accompanying drawings, which exemplify the invention, it being understood that changes may be made in the specific method and apparatus disclosed herein without departing from the essentials of the invention set forth in the appended claims.

The accompanying drawings illustrate two complete examples of apparatus embodying the method of the invention, constructed according to the best modes so far devised for the practical application of the principles thereof, and in which.

Figure 1:
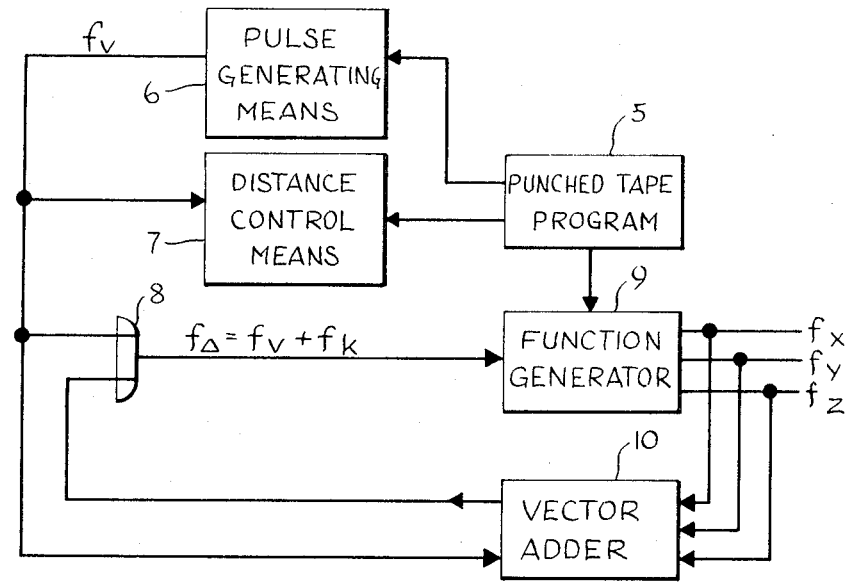
FIG. 1 is a generalized block diagram of one form of apparatus embodying the method of this invention.

In the following explanation it will be assumed that the described apparatus is employed with a numerically controlled machine tool, and, again, the simplifying assumption will be made that only the cutting tool moves, although it will be apparent that the principles of the invention will be equally applicable to machines wherein movement is imparted to only the workpiece carrier, or to both the cutting tool and the workpiece carrier. It will also be assumed that the cutting tool is movable along three mutually perpendicular coordinate axes, designated $x$, $y$ and $z$, and has a separate servo for each axis, by which it can be propelled along the axis in either direction. Each servo is pulse-responsive as to its speed, that is, it tend to effect movement through a predetermined incremental distance for each pulse fed to it, and the time rate (frequency) at which pulses are fed to a servo therefore determines the component of the cutting tool speed vector that is parallel to the axis to which that servo is assigned.

The above described apparatus, being conventional and familiar to those skilled in the art, is not shown in the drawings.

At each stage of an operation, the direction of movement of the cutting tool, the distance through which it moves, and the speed at which it moves are determined by a program which may be encoded on a punched tape or the like, cooperating with tape reading mechanism in a known arrangement. The program apparatus is designated by block 5 in FIG. 1.

For controlling the speeds of the servos, pulses are generated by a conventional pulse generator 6, at a fundamental frequency $f_v$ which may vary from time to time under the control of the program apparatus. Since each pulse can be assigned to one or another of the coordinate axes, and denotes a predetermined increment of cutting tool motion along the axis to which it is assigned, the pulses are employed in some numerically controlled machine tools to control the distance through which the cutting tool moves in each direction, in addition to their utilization in control of speed and direction of motion of the cutting tool. As designated by the block 7 in FIG. 1, the pulses of the fundamental frequency can be employed for distance control in apparatus embodying the method of this invention, or other means can be employed for that purpose if preferred.

As employed for control of the speed and direction of motion of the cutting tool, each pulse is applied to impart a predetermined quantum of energy to the servo to which it is assigned, and the speed of the servo thus depends upon the frequency of the pulses applied to it.

More specifically, the direction of motion of the cutting tool at any instant is the vector sum of its components of motion along the several axes, and is thus a function of the relative speeds at which its several servos are operating. And since the speed of each servo depends upon the pulse frequency fed to it, the direction of motion of the cutting tool is controlled by the program apparatus by causing successive pulses of a pulse stream to be distributed among the several servos, so that the pulse frequency assigned to each servo is in such relationship to the pulse frequencies assigned to the others that the cutting tool moves in the desired direction. If the speed of the cutting tool is to be increased without change in its direction of motion, then the assigned frequencies for the several servos must be increased without changing the proportional relationship between those assigned frequencies, and this of course requires that there be an increase in the frequency of the stream of pulses to be distributed.

It may be helpful to mention at this point that the absolute number of pulses fed to a servo during a given traverse is of no significance with respect to distance traveled along the servo axis by the cutting tool in the course of that traverse, even though each pulse denotes a predetermined distance increment, but, rather, that the frequency at which pulses are fed to the servo is the significant factor with respect to speed and direction of cutting tool motion. This is to say that where the generated pulses are employed for distance control, they are utilized in a different manner than they are for speed and direction control, with which the present invention is concerned; and it is merely a convenience that pulses from the same source are utilized for these two functions. Hence, a pulse could, if desired, signify one increment of movement for purposes of distance control and a different one for purposes of speed and direction control.

With these fundamentals in mind, the method of this invention, which is performed by the apparatus illustrated in FIG. 1, will now be explained.

When the cutting tool is to move, pulses are generated by the pulse generator 6 at the fundamental frequency $f_v$, which frequency may be increased by injected pulses, produced as described hereinafter, to provide pulses at an augmented frequency $f_A$. All pulses are assigned and distributed to the several axes in accordance with the frequency relationship between the axes that is needed to achieve the programmed direction of cutting tool movement.

According to the method of this invention, the pulse assignments thus made are analyzed by groups of pulses. For this, successive pulses, regardless of the axis to which they are assigned, are counted into successive groups, each group containing the same number of pulses. On the basis of the distribution of the pulses of each group among the several axes, augmenting pulses are injected into the pulse stream, between pulses of the fundamental frequency, to produce the augmented pulse frequency. The number of augmenting pulses injected into the pulse stream depends upon the relationship between, on the one hand, the total distance signified by the group of pulses (number of pulses in the group times distance increment signified by each pulse) and, on the other hand, the distance along the shortcut path across the stairstep pattern signified by the distribution of the pulses of the group.

The number of pulses in each group should be a multiple of the number of axes along which the cutting tool can be controlledly moved, which multiple should be relatively small but should be an integer larger than one. Since each group of pulses is thus a small one, and each group contains the same number of pulses as every other group, a group can have only a limited number of pulse distribution possibilities, and the number of augmenting pulses signified by each such possible distribution can be readily precalculated.

It will be understood that the augmented pulse frequency $f_\Delta$ is applied to the control of the servos, the pulses of the augmented frequency being distributed in accordance with the programmed direction of cutting tool motion. It will also be appreciated that if the pulse distribution of any one group of pulses that is analyzed should be non-representative of the programmed direction of the cutting tool at the time of such analysis, owing to the small number of pulses in the group, then there will usually be an offsetting error in the pulse distribution of the next succeeding group or groups of pulses to be analyzed; hence during the relatively short time interval required for analysis of several successive groups of pulses, the errors in analysis of each group will compensate for one another to such an extent that the cutting tool will maintain its programmed direction and speed of motion with satisfactory accuracy.

It will be apparent that the augmented frequency $f\Delta$ increases with increasing obliqueness of the direction of cutting tool movement, to maintain the speed of the cutting tool in its oblique motion substantially equal to its speed along an axis at the same fundamental frequency.

Further details of the method will become apparent from the description of its practice by means of the apparatus illustrated in the accompanying drawings.

In general, the apparatus shown in FIG. 1 comprises an OR-gate 8, a function generator 9 which has one input connected with the output of the OR-gate and another input from the program apparatus, and a vector adder 10 which has an input connection with the output of the function generator and an output connected with the input side of the OR-gate.

Pulses from the pulse generating means 6, at the fundamental frequency $f_v$, are applied to one input of the OR-gate 8, and by it are passed to the function generator 9. The OR-gate 8 also receives augmenting pulses from the vector adder and passes these to the function generator along with pulses of the fundamental frequency, so that the function generator receives pulses of the augmented frequency $f_\Delta$. The function generator also receives an input, either directly or (as shown) indirectly, from the program apparatus, on the basis of which the function generator assigns and distributes the incoming pulses to the several axes in accordance with the direction in which the cutting tool is programmed to move at the time the pulses are being fed to it. The assignment of pulses to axes is in effect a resolution of the vector of programmed cutting tool motion into the components of that motion along the several axes. Since the function generator is making such pulse distributions continuously, it is in effect assigning pulse frequencies to the several axes, and therefore its output is denoted by $f_x$, $f_y$ and $f_z$, designating the frequencies assigned to the respective $x$, $y$ and $z$ axes.

Figure 2:
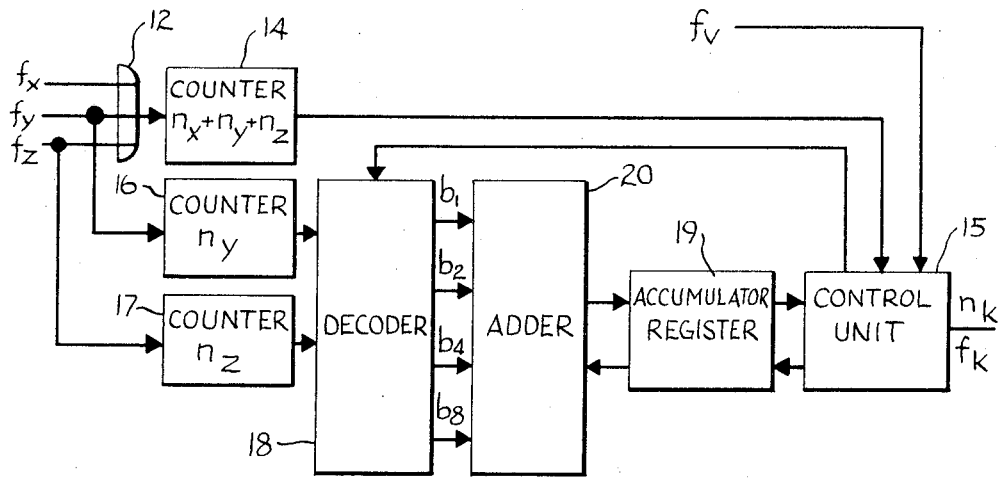
FIG. 2 is a more particularlized block diagram of certain parts of the apparatus shown in FIG. 1.

To facilitate an understanding of the apparatus comprising the vector adder 10, which is diagrammatically illustrated in FIG. 2, its functions must first be explained.

If $n_x$, $n_y$ and $n_z$ designate the number of uniform incremental distances through which the cutting tool is required to move on the respective $x$, $y$ and $z$ axes to cause it to move a certain distance in a desired cutting direction, then the total stairstep distance that would be traversed by the tool in moving through that distance can be expressed as $n_\Delta$, the sum of the increment distances, or $$n_\Delta = n_x + n_y + n_z.$$

If $n_v$ signifies the number of the same incremental distance units that are required for the direct movement of the tool along the corresponding shortcut path, then $n_v = \sqrt{n_x^2 + n_y^2 + n_z^2}$ obviously, $n_v$ is smaller than $n\Delta$ by an amount which depends upon how the increments are distributed on the various axes. If $n_k$ signifies the number of increments that must be added to $n_v$ to bring the latter to equality with $n\Delta$, then $n\Delta = n_v + n_k$, and $$n_k = n_x + n_y + n_z - \sqrt{n_x^2 + n_y^2 + n_z^2}$$

By dividing the above equations by time $t$, an analogous equation is obtained for the number of pulses per unit of time — i.e., the frequency of pulses — that must be injected into pulses of the fundamental frequency to obtain the required augmented frequency:

$$f_k = f_x + f_y + f_z - \sqrt{f_x^2 + f_y^2 + f_z^2}$$

Thus $f_k$ is an augmenting frequency which varies with the programmed direction of movement of the cutting tool and which is obtained by analysis of the distribution on the several axes of the pulses of successive pulse groups. Since the fundamental frequency $f_v$ corresponds to a predetermined cutting tool speed parallel to any one of the axes, if there is added to it a pulse signal of the frequency $f_k$, an augmented frequency $f\Delta = f_v + f_k$, which corresponds to the same predetermined cutting tool speed in the direction for which $f_k$ is calculated. When this augmented frequency signal has its pulses distributed on the respective axes in accordance with the programmed direction of movement of the cutting tool, the cutting tool will move in the programmed direction and will move at the programmed speed irrespective of its direction of movement.

It will now be apparent that the function of the vector adder 10 in FIG. 1 is to analyze pulses in successive groups, each group containing the same number of successive pulses, and to calculate $f_k$ for each group of pulses in accordance with the above equation and on the basis of the distribution of the pulses of the group that has been made by the function generator. And, of course, the vector adder also serves to produce pulses at the $f_k$ frequency. To perform its functions, the vector adder receives input from the function generator that respectively correspond to $f_x$, $f_y$ and $f_z$, and has its output connected with the OR-gate 8 to enable the OR-gate to total the frequencies $f_v$ and $f_k$, and provide the augmented pulse frequency $f_\Delta = f_v + f_k$.

It is essential to make a careful choice of the number of pulses that are to comprise each group to be analyzed. If the group consists of a small number of pulses, the resolution of the programmed direction of movement into components along the several axes will necessarily be coarse and approximate. On the other hand, if each group consists of a large number of pulses there is a risk of error from the delay attendant upon generating that number of pulses, and there is the disadvantage that more elaborate and expensive equipment is required for evaluating the distribution of a large number of pulses on the several axes. It will be evident, however, that the number of pulses comprising each group is preferably an integral multiple (larger than one) of the number of axes along which the cutting tool is controlledly movable.

It has been found suitable for the purposes of the invention to analyze pulse distribution in a three-axis machine in pulse groups of six successive pulses each. If permutations between the axes are disregarded, it is clear that six consecutive pulses can be assigned to three axes in seven different distributions, which are set forth in the following table. The table also gives the calculated value of $n_k$ for each such distribution, a rounded-off value of $n_k$, and a scaled value of $n_k$ obtained by multiplying the rounded-off $n_k$ value by 4.

| Number | Distribution | Calculated $n_k$ | Rounded-off $n_k$ | Scaled $n_k$ |
|---|---|---|---|---|
| I | 6 0 0 | 0.00 | 0.00 | 0 |
| II | 5 1 0 | 0.90 | 1.00 | 4 |
| III | 4 2 0 | 1.53 | 1.50 | 6 |
| IV | 4 1 1 | 1.76 | 1.75 | 7 |
| V | 3 3 0 | 1.76 | 1.75 | 7 |
| VI | 3 2 1 | 2.26 | 2.25 | 9 |
| VII | 2 2 2 | 2.54 | 2.50 | 10 |

In response to an input from the function generator having one of the above tabulated patterns of pulse distribution, the vector adder 10 issues to one of its elements an output which corresponds to the binary form of the scaled value of $n_k$ for that distribution. In turn, that element causes pulses of the augmenting frequency $f_k$ to be issued in accordance with the scaled value of $n_k$ fed to it.

For the purpose of making its analysis of pulse distribution the vector adder comprises the apparatus diagrammatically shown in FIG. 2, comprising an OR-gate 12, to the input side of which the three assigned pulse frequencies $f_x$, $f_y$ and $f_z$ are fed from he function generator. The OR-gate 12 feeds pulses of all three frequencies to a counter 14, which issues a pulse output to a control unit 15 each time it has received six successive pulses. The counter 14 thus serves to define the groups of successive pulses into which the flow of pulses is divided for purposes of analysis, and in this case each group of course contains six pulses, for the reason explained above. The pulses which the function generator has assigned to movement along the y axis are fed directly to another counter 16, which thus receives pulses at the frequency $f_y$; and a third counter 17 receives pulses at the frequency $f_z$. Since the total number of pulses used for the analysis is established by the counter 14 and is therefore known, the number of x-axis pulses is likewise known.

The counters 16 and 17 for the $n_y$ and $n_z$ pulses have their outputs connected with a decoder 18 comprising logic circuits which provide four binary outputs $b_1$, $b_2$, $b_4$ and $b_8$. The decoder determines, from the conditions of the counters 16 and 17, which of the distributions set forth in the above table exists, receiving a signal from the control unit 15 upon the completion of each pulse group, and in accordance with the distribution thus determined, produces on its outputs the corresponding scaled value of $n_k$ in binary form. These outputs from the decoder are fed to an accumulator register 19 by way of an adder 20. The accumulator register also has input and output connections with the control unit.

Figure 3:
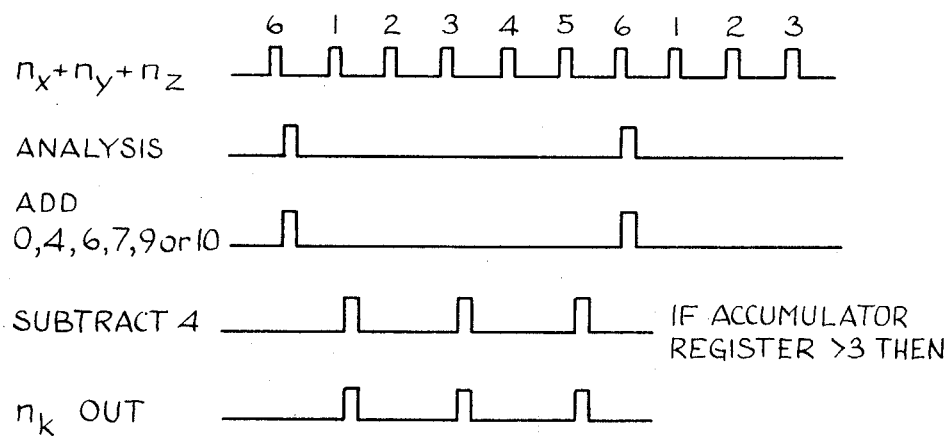
FIG. 3 is a pulse-time diagram illustrating pulses which occur at certain points in the apparatus illustrated in FIG. 2 and the times at which they occur in relation to one another.

The accumulator register cooperates with the adder to store the scaled $n_k$ values issued by the decoder. When the incoming scaled $n_k$ value fed into the accumulator register, together with that previously stored therein, is equal to four or more, the number 4 is subtracted from the accumulator register content, and at the same time the control unit issues a correction pulse which is fed back to the OR-gate 8. If a renewed scanning of the contents of the accumulator register indicates that it still contains a value of four or more, another subtraction of four takes place and, correspondingly, another correction pulse is issued. The course is sketched in a much simplified manner in FIG. 3. Note that, as indicated in FIG. 3, the correction pulses $n_k$ are synchronized to the interval between pulses of the fundamental frequency $f_v$ and are timed to occur after the first, third and fifth pulses, respectively.

The reason for subtracting four from the contents of the accumulator register each time a correction pulse is issued is that four is the scale factor by which the calculated value of $n_k$ has been multiplied to provide a value which is a whole number. Thus account is taken of fractions of $n_k$ by reason of the fact that an augmenting pulse is issued only if the contents of the accumulator register totals more than three.

Figure 4:
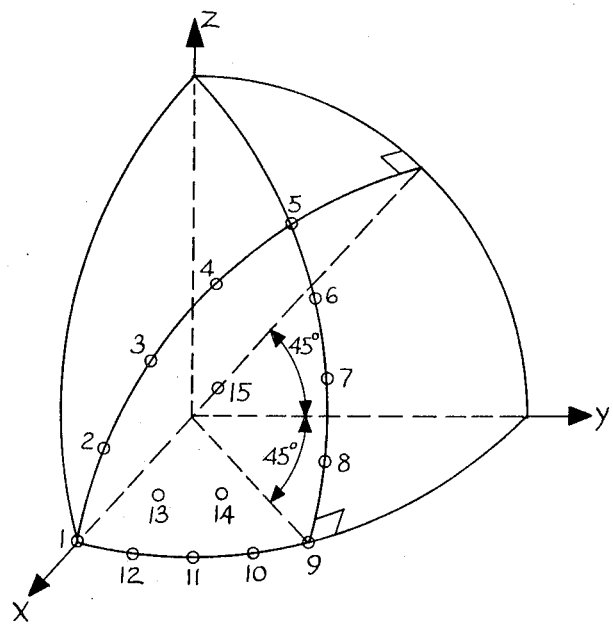
FIG. 4 illustrates a part of the surface of a sphere which has its center on the origin of a coordinate axis system and which symbolizes speed vectors that extend in all directions from said origin, used in determining the accuracy of cutting tool speed control in accordance with the method of this invention.

The accuracy of cutting tool speed correction that is achieved by means of the method of this invention can be calculated in terms of percentage of the correct speed by calculating the relationship between the required speed vectors for different directions of motion and those obtained with the method of this invention. It is sufficient for this purpose to consider a surface constituting one-forty eighth of the surface of a sphere, in accordance with FIG. 4, since the surface of a sphere can be divided into 48 similar part surfaces, on each of which any point will have a relationship to a set of coordinate axes that is congruent to the relationship to the same axes of a corresponding point on any other part surface. The directions of tool travel are represented by points 1–15 in FIG. 4, through which vectors are imagined to extend from the origin of the axis system designated by x, y and z, and for each of which points the co-ordinates are given in the following table. The table also shows accuracies in cutting tool speed obtained by the method of this invention in motion along the vector through the point, in relation to the correct speed. The plus symbol before an accuracy value indicates that the method of this invention produces too high a speed (i.e., speed vector too long); the minus sign that it is too low.

| Point No. | Approximate co-ordinate | | | Error in vector % |
|---|---|---|---|---|
| | x | y | z | |
| 1 | 100 | 0 | 0 | 0 |
| 2 | 96 | 20 | 20 | <1 |
| 3 | 86 | 36 | 36 | +2.8 |
| 4 | 72 | 49 | 49 | +3.0 |
| 5 | 58 | 58 | 58 | +1.1 |
| 6 | 64 | 64 | 42 | +3.3 |
| 7 | 68 | 68 | 29 | +2.2 |
| 8 | 70 | 70 | 14 | +2.2 |
| 9 | 71 | 71 | 0 | <1 |
| 10 | 83 | 56 | 0 | +1.8 |
| 11 | 92 | 39 | 0 | <1 |
| 12 | 98 | 20 | 0 | −1.6 |
| 13 | 91 | 37 | 16 | +2.0 |
| 14 | 84 | 52 | 14 | +3.8 |
| 15 | 79 | 51 | 33 | −1.5 |

It can be seen that the maximum error is less than 4 percent, which is acceptable for three-axis systems.

It will be apparent from the foregoing explanation that the crux of the method of this invention resides in calculating a relationship between the total distance that the cutting tool would travel in stairstep motion according to the assigned pulses of each group and the direct distance to be traversed by such motion; and, more specifically, in precalculating that relationship for each possible distribution of the pulses of a group. In the above described apparatus the relationship thus calculated is a difference value. With the apparatus illustrated in FIGS. 5 and 6, the calculated relationship is a proportional one.

Since the purpose of the method is to provide pulses which augment those of the fundamental frequency $f_v$, to produce an augmented frequency $f_\Delta$, the augmented frequency can be obtained by multiplying the fundamental frequency by a correction factor $a$, the relationship then being:

$$f_\Delta = a \cdot f_v$$

On the basis of the hereinabove expressed relationships between $f_v$ and $f_\Delta$ with respect to $f_x, f_y$ and $f_z$:

$$a = (f_x + f_y + f_z)/\sqrt{f_x^2 + f_y^2 + f_z^2}$$

In the following table, $a$ has been calculated for the distributions identified by I–VII in the first table above. The following table also includes scaled values of $a$ and rounded-off scaled values of $a$, given for reasons explained below.

| Distribution No. | Correction factor $a$ | | |
|---|---|---|---|
| | Calculated value | Scaled value | Rounded off value |
| I | 1.00 | 1/32 | 1/32 |
| II | 1.18 | 1/27.2 | 1/27 |
| III | 1.34 | 1/23.8 | 1/24 |
| IV | 1.41 | 1/22.6 | 1/23 |
| V | 1.41 | 1/22.6 | 1/23 |
| VI | 1.60 | 1/20 | 1/20 |
| VII | 1.73 | 1/18.4 | 1/18 |

The apparatus illustrated in FIGS. 5 and 6 again comprises a function generator 9, which functions the same as that of the FIGS. 1 and 2 embodiment, and which, like it, has its outputs connected with a vector adder 10'. The vector adder has the same general function as that described above, that is, it analyzes the distribution of pulses on the several axes, as effected by the function generator, and on the basis of that analysis effects issuance of the necessary augmenting pulses. In this case, however, the vector adder issues to a multiplier 23 a signal corresponding to the correction factor $a$, and the multiplier issues augmenting pulses in carrying out $f_\Delta = f_v \cdot a$. The augmented frequency thus obtained is fed to the function generator by the multiplier.

Figure 6:
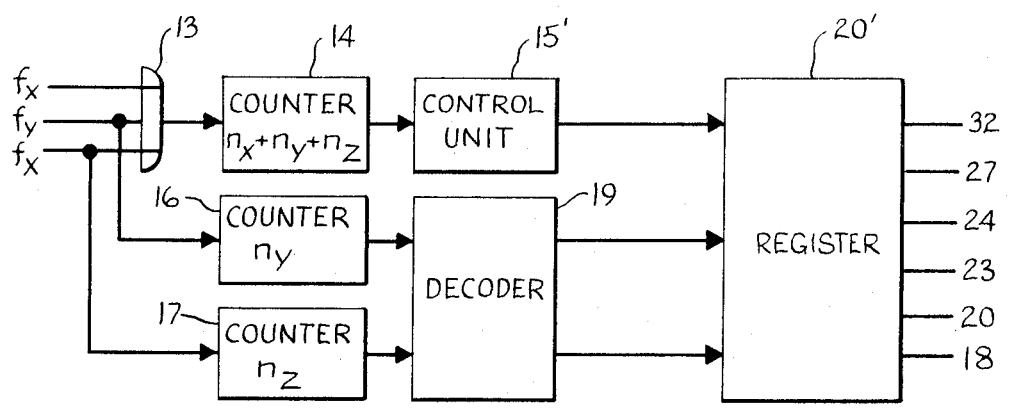
FIG. 6 is a more particularized block diagram of certain parts of the apparatus shown in FIG. 5.

The vector adder 10' comprises, as illustrated in FIG. 6, an OR-gate 13, counters 14, 16 and 17, and a decoder 19, all of which function like the correspondingly designated elements of the FIGS. 1 and 2 apparatus. In this case, however, the counter 14 is connected with a somewhat different control unit 15' and the latter, in turn, is connected with a register 20', to which the decoder 19 is also connected. When the counter 14 has counted six pulses and has issued to the control unit 15' a signal that it has done so, the control unit emits a command to the register 20' which issues a signal in accordance with the analysis input that has been supplied to it by the decoder. The signal emitted by the register 20' corresponds to one of the values 32, 27, 24, 23, 20 or 18, which are the denominators of the rounded-off values of the correction factor $a$. The multiplier 23 comprises a counter with variable counting length and means for feeding pulses to it at a rate which is 32 times the fundamental frequency, i.e., $32 \cdot f_v$. The signal emitted by the register 20' designates the counting length for which the variable counting length counter is set, and it issues an augmenting pulse signal when it has counted that number of pulses. Thus if the signal to the register from the decoder signifies a distribution according to No. III in the table above, the register issues to the multiplier a signal corresponding to 24, and the variable length counter of the multiplier issues a pulse for every 24th pulse that it receives in the $32 \cdot f_v$ frequency that is supplied to it. Hence the augmented frequency will be $f_\Delta = 32 \cdot f_v \cdot 1/24 = 1.34 \cdot f_v$, which is the corrected or augmented frequency for distribution III in the above table.

Figure 5:
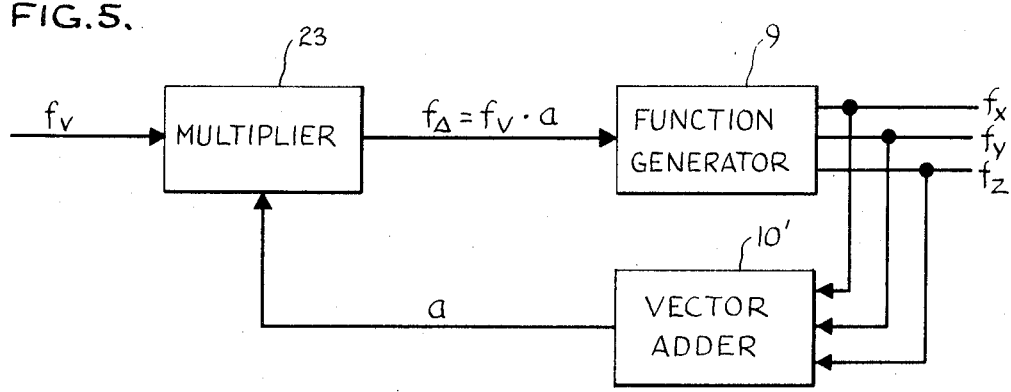
FIG. 5 is a generalized block diagram of apparatus for practicing a modified form of the method of this invention.

The choice of 1/32 for the scale factor in the apparatus illustrated in FIGS. 5 and 6 is due to the fact that the multiplier comprises a counter with variable counting length and that it is desirable that the correction factor $a$ should have the form $1/n'$, wherein $n'$ is a whole number. The number 32 is the lowest one in the series, 1, 2, 4, 8, 16, 32 ... that gives a good approximation.

From the foregoing explanation together with the accompanying drawings it will be apparent that this invention provides a marked improvement in the art relating to numerically controlled machine tools wherein pulses are generated at a fundamental frequency and are employed for controlling the speed of the cutting tool movement, which improvement consists in a method of so augmenting the fundamental pulse frequency as to maintain the cutting tool moving in the programmed direction and at substantially the speed that the fundamental frequency signifies for movement along an axis, irrespective of whether or not the programmed direction of motion is parallel to an axis.

Those skilled in the art will appreciate that the invention can be embodied in forms other than as herein disclosed for purposes of illustration.

The invention is defined by the following claims.

I claim:

1. In the art relating to numerically controlled machine tools of the type comprising an element that is movable to effect relative motion between a cutting tool and a workpiece, program means for effecting predetermined motions of said element relative to a system of coordinate axes, a pulse generator which generates pulses at a fundamental frequency controlled by the program means, each pulse corresponding to a predetermined increment of motion of said element along an axis, and function generator means to which pulses are fed and which is operatively associated with the program means to distribute pulses to the several axes in such a manner that the frequency of pulses assigned to each axis corresponds to the component along that axis of the programmed vector of motion of said element, the method of maintaining the speed of motion of said element at substantially the value which the fundamental frequency assigns to movement of the element along an axis, even at times when the element is programmed to move obliquely to axes, which method is characterized by:

A. counting successive pulses into successive equal groups, the number of pulses in each group being an integral multiple of the number of axes so that the pulses of a group can have only a limited number of possible distributions among the several axes;

B. for each such possible pulse distribution predetermining a number of supplemental pulses which is a function of a relationship between the total distance that the cutting tool would traverse in movement along the axes in the pattern signified by the pulse distribution and the direct distance traversed in such movement;

C. as each group of pulses in counted, recording the number of pulses of the group that are distributed to each of the different axes, for determination of the number of supplemental pulses that is appropriate to the pulse distribution of the group;

D. generating the number of supplemental pulses determined to be appropriate to the pulse distribution of each counted group and injecting such number of supplemental pulses between pulses of the fundamental frequency that are generated immediately after the group has been counted, to produce pulses at an augmented frequency; and E. feeding pulses of the augmented frequency to the function generator means.

2. In the art relating to numerically controlled machine tools of the type comprising an element that is movable to effect relative motion between a cutting tool and a workpiece, program means for effecting predetermined motions of said element relative to a system of coordinate axes, a pulse generator which generates pulses at a fundamental frequency controlled by the program means, each pulse corresponding to a predetermined increment of motion of said element along an axis, and function generator means to which pulses are fed and which is operatively associated with the program means to distribute pulses to the several axes in such a manner that the frequency of pulses assigned to each axis corresponds to the component along that axis of the programmed vector of motion of said element, the method of maintaining the speed of motion of said element at substantially the value which the fundamental frequency assigns to movement of the element along an axis, even at times when the element is programmed to move obliquely to axes, which method is characterized by:

A. counting successive pulses into successive equal groups, the number of pulses in each group being an integral multiple of the number of axes so that the pulses of a group can have only a limited number of possible distributions among the several axes;

B. for each such possible pulse distribution predetermining a pulse frequency correction value which is a function of the ratio between the total distance that the cutting tool would traverse in movement along the axes in the pattern signified by the pulse distribution and the direct distance traversed in such movement;

C. for each group of pulses counted, producing and storing a binary input having a magnitude which substantially corresponds to a predetermined multiple of the pulse frequency correction value for the group;

D. each time the stored binary input reaches at least a value corresponding to said multiple, issuing a supplemental pulse and reducing the stored value of binary input by a magnitude corresponding to said multiple; and E. feeding supplemental pulses to the function generator between pulses of the fundamental frequency.

* * * * *